(12) United States Patent
Green et al.

(10) Patent No.: US 8,497,940 B2
(45) Date of Patent: Jul. 30, 2013

(54) HIGH DENSITY WIRELESS SYSTEM

(75) Inventors: Bob Green, Stow, OH (US); Masahiko Igarashi, Stow, OH (US); Tadashi Kikutani, Stow, OH (US); Yoshihiko Naito, Stow, OH (US)

(73) Assignee: Audio-Technica U.S., Inc., Stow, OH (US)

( * ) Notice: Subject to any disclaimer, the term of this patent is extended or adjusted under 35 U.S.C. 154(b) by 84 days.

(21) Appl. No.: 13/295,561

(22) Filed: Nov. 14, 2011

(65) Prior Publication Data

US 2012/0120313 A1 May 17, 2012

Related U.S. Application Data

(60) Provisional application No. 61/414,124, filed on Nov. 16, 2010.

(51) Int. Cl.
*H04N 7/06* (2006.01)

(52) U.S. Cl.
USPC .......................................... 348/485; 348/484

(58) Field of Classification Search
USPC ....................................................... 348/485
See application file for complete search history.

(56) References Cited

U.S. PATENT DOCUMENTS 5,065,430 A * 11/1991 Torii et al. ..................... 380/38
5,526,530 A    6/1996 Sueoka et al.
5,909,489 A * 6/1999 Matt et al. ................ 379/406.08

2002/0032001 A1 * 3/2002 Fischer et al. ............... 455/3.01
2003/0157916 A1   8/2003 Kamimura
2008/0233966 A1 * 9/2008 Scheim et al. ............. 455/452.1

FOREIGN PATENT DOCUMENTS

| WO | WO96/41498   | 12/1996 |
| WO | WO2004/088873 | 10/2004 |
| WO | WO2007/045081 | 4/2007  |

OTHER PUBLICATIONS

European Search Report for related patent application No. EP 11 189 332.7.

* cited by examiner

*Primary Examiner* — Jefferey Harold
*Assistant Examiner* — Justin Sanders
(74) *Attorney, Agent, or Firm* — Husch Blackwell LLP

(57) ABSTRACT

A method and apparatus for communicating within a wireless microphone system having a plurality of audio channels. The method includes the steps of dividing a small block of radio frequency spectrum associated with a single television broadcast channel into a plurality of at least 20 contiguous subchannels that are also contiguous with the boundaries of the television broadcast channel where each of the subchannels is less than 75 kHz and transmitting an audio signal from a microphone transmitter on one the plurality of subchannels through a transmitter with a radio frequency isolator or other means for suppressing intermodulation energy coupled to an antenna, the radio frequency isolator having a bandwidth no larger than any one of the plurality of divided subchannels; and receiving the audio signal through a microphone receiver.

20 Claims, 7 Drawing Sheets

HIGH DENSITY WIRELESS SYSTEM

FIELD OF THE INVENTION

The field of the invention relates to wireless devices and more particularly, to wireless microphones.

BACKGROUND OF THE INVENTION

The trend in regulation globally is for reduced bandwidth available for wireless microphones. Some countries are further ahead of others but a user should expect that there will be less bandwidth in general. For example, on Mar. 16$^{th}$, 2010, the U.S. FCC published its Broadband Plan. In this plan they announced their intention to reclaim 120 MHz of the broadcast band for use in broadband access across the country.

The trend for demand is just the opposite. Large venues and installations would like to use more and more microphones simultaneously. In US cities, the recent restriction on bandwidth makes it difficult for venues to use the same number of simultaneous channels as they had in the past.

The allowed spectrum for wireless microphones in most areas of the world overlaps with the broadcast TV spectrum. Wireless microphones must be used, per regulations, in open spectrum between the channels used for TV broadcast. Depending on the region of operation, the size of the broadcast channels is either 6 MHz or 8 MHz. In Japan the spectrum available for wireless microphones is reserved outside of the TV broadcast band. There are two 9 MHz bands (A Bands) and one 4 MHz Band (B Band) available.

In the current state of the art for wireless microphone systems, there are two factors which limit the number of channels which can be used within a specified bandwidth. The two factors include channel spacing and intermodulation products. Intermodulation products may be avoided by limiting the frequencies available in a channel plan to those which are not equal to, or close to an intermodulation product of the other frequencies in the channel plan.

The prior art has avoided these difficulties by increasing the channel spacing to avoid these problems. Accordingly, a need exists for more efficient frequency use among wireless microphones.

DETAILED DESCRIPTION OF AN ILLUSTRATED EMBODIMENT

Figure 1:
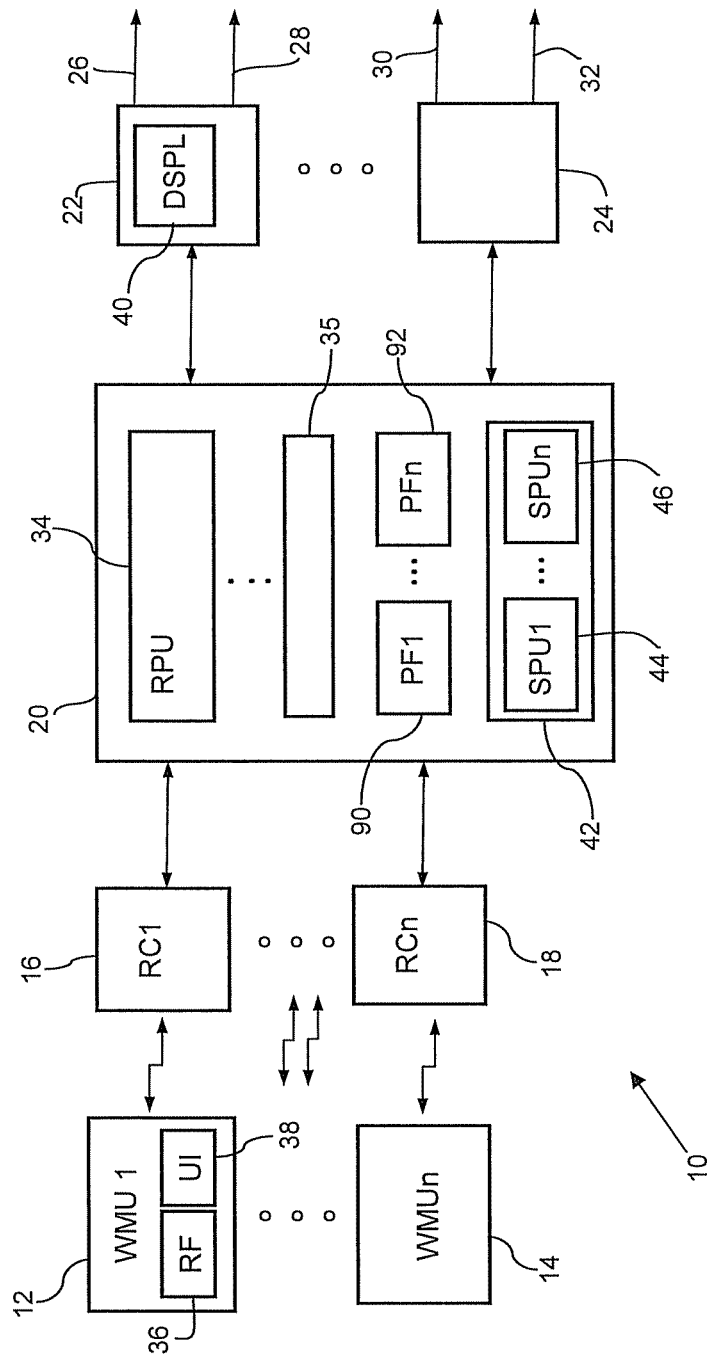
FIG. 1 is a block diagram of a wireless microphone system shown generally in accordance with an illustrated embodiment of the invention.

FIG. 1 is a wireless microphone system 10 for voice and/or music shown generally in accordance with an illustrated embodiment of the invention. The system 10 may include one or more wireless microphones 12, 14 and a base station including the functionality of at least one transceiver 16, 18, a controller 20 and at least one channel receiver 22, 24.

The microphones 12, 14 of the system 10 may operate in any appropriate radio frequency range. For example, in the U.S., the system 10 may operate in the 470 to 698 MHz range and may be configured to occupy one or more 6 MHz wide broadcast channels that are not otherwise being used by a local television station.

In Japan, the system 10 may operate in a 32 MHz wide spectrum allocated for wireless microphones. Because of other users (e.g., television stations, other wireless microphone systems, etc.) within the available spectrum, it is often necessary for the system 10 to operate within small discrete portions of an available broadcast channel. For example, in the 6 MHz wide television broadcast channels in the U.S., it may be necessary to allow a 1 MHz guardband on opposing sides of the 6 MHz broadcast channel and divide the remaining 4 MHz into a number of potentially available radio frequency (rf) channels that may be used by each of the wireless microphones.

As shown in FIG. 1, the microphone system 10 includes a number of wireless microphones (wireless microphone units) 12, 14. Consistent with this concept, the wireless microphones may each include a receiver and a small, lower power transmitter that operates on a control channel and that also transmits an audio signal within a transmission channel. The audio transmission channel has a required bandwidth of less than 75 kHz and, with appropriate filtering, allows for channel spacing of 125 kHz. The 75 kHz bandwidth and 125 kHz channel spacing potentially allows for up to 31 wireless microphones 12, 14 to occupy the remaining 4 MHz of a television broadcast channel.

In order to facilitate the use of the narrow spectrum transmission channels, the microphone units 12, 14 may be provided with specific features to reduce or eliminate intermodulation distortion products. One of these features may be a radio frequency (rf) isolator 36. In this case, the rf isolator is disposed between a power amplifier and the transmission antenna of the microphone unit 12, 14.

Also shown in FIG. 1 is two or more receivers 16, 18 that together function as a diversity receiver connected to a controller 20. The controller 20 may include one or more programmed processors 34, 35 that control operation of the microphones 12, 14, the processing of signals from the microphones 12, 14 and the routing of those audio signals. A user may interact with the programmed processors 34, 35 via a user interface 40 on channel receivers 22, 24 to set up operation of the microphones 12, 14 and to configure a routing path of an audio signal from each of the microphones 12, 14 as discussed in more detail below.

The diversity receivers 16, 18 may be distributed throughout an area of use of the wireless microphones 12, 14. Each diversity receiver 16, 18 may include a transceiver that exchanges control signals with each of the wireless microphones 12, 14 and that receives an audio signal from each of the wireless microphones 12, 14. The audio signals through the two or more diversity receivers 16, 18 provide parallel paths through the controller 20 to a predetermined audio output 26, 28, 30, 32 of a designated channel receiver 22, 24.

While FIG. 1 shows two diversity receivers 16, 18 and a controller 20, the system 10 may also be constructed within only a single receiver 16, 18 and controller 20. In this case, the single receiver 16, 18 and controller 20 may be combined.

The receivers 16, 18 and controller 20 may be located near or integrated with an antenna assembly that receive rf signals directly from the wireless microphones 12, 14 through some intervening air space. In this case, the radio frequency processing may occur within the receivers 16, 18 and/or controller 20.

In general, the wireless microphones 12, 14 may operate under a frequency division multiple access (FDMA) format where each wireless microphone 12, 14 is assigned to a particular rf channel automatically by the controller 20, or may be manually assigned by the user. In order to further improve spectral efficiency, a number of wireless microphones 12, 14 may also be assigned to operate in different time slots on the same rf channel under a TDMA format. Each of the wireless microphones 12, 14 may be synchronized to the controller 20 via a synchronization signal transmitted by the controller 20 through a transmitter associated and within one or more of the receivers 16, 18.

Figure 2:
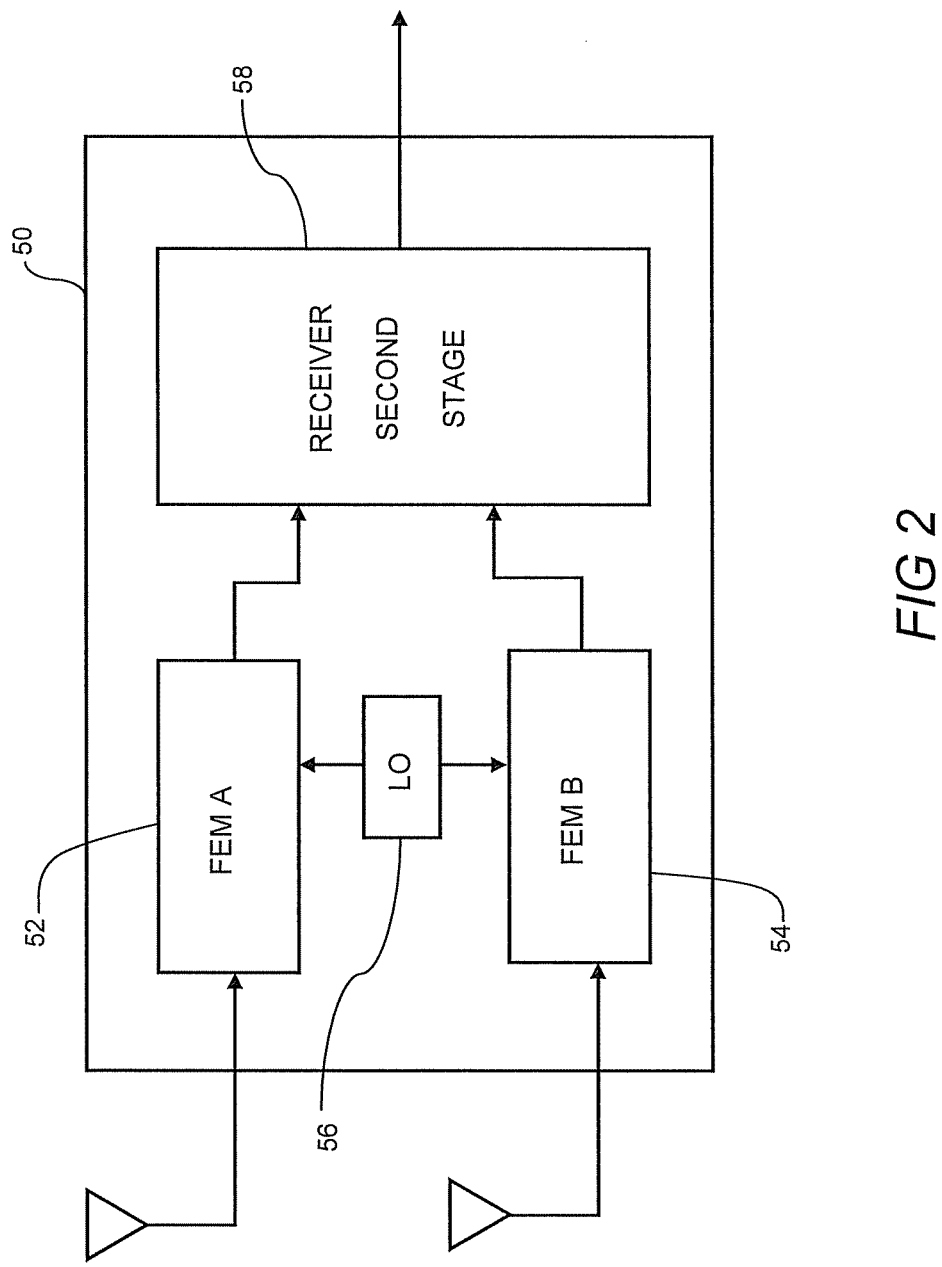
FIG. 2 shows an example of a receiver module architecture that may be used with the system of FIG. 1.

FIG. 2 depicts a simplified receiver 50 that does the rf processing accomplished within the receivers 16, 18 and/or controller 20. The receiver 50 of FIG. 2 comprises three functional blocks: the front end modules 52, 54, the common local oscillator (LO) 56, and the receiver second stage 58.

The receiver front end module 52, 54 provide the functionality of selecting a frequency range and reducing any signal within that range to the first intermediate frequency (IF1) output. These modules contain the filtering, high linearity amplifiers and mixers required to achieve the high spectral density signal processing of the system 10.

At the center of this concept is a device that breaks up the selected band into separate broadcast sub-bands or small blocks of radio frequency spectrum (associated with a single broadcast television channel) which can be maximized for the highest number of simultaneously available, microphone channels possible. The width of the sub-bands of the chosen spectrum is typically equal to the band width of one or more of the TV broadcast channels allowed in the region of operation (e.g. 6 MHz in the US, 8 MHz in Europe, etc.). Different filter configurations will be used depending on the intended region of operation.

Figure 3:
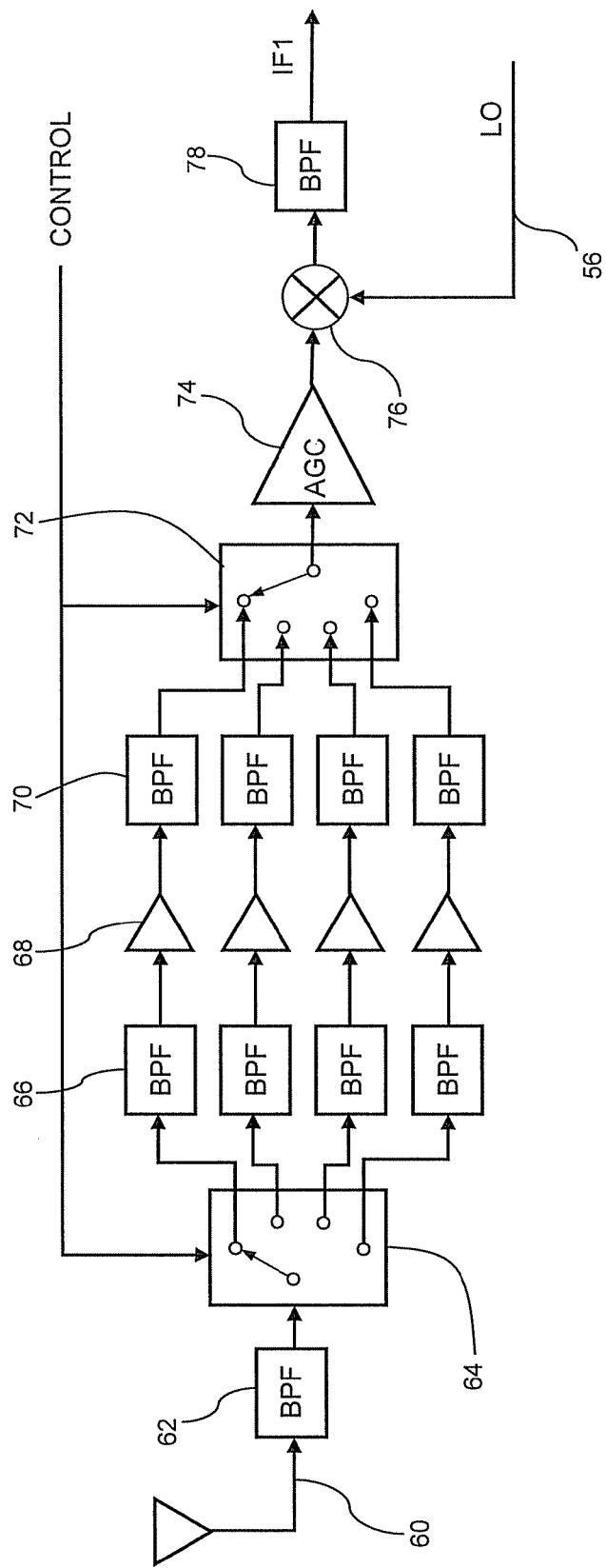
FIG. 3 is an example of the receiver front end module of FIG. 2 for 6 MHz standard TV channels in the U.S.

The two front end modules 52, 54 provide the functionality of the diversity receiver 16, 18 shown in FIG. 1. They share a common Local Oscillator (LO 1) 56. The front end modules 52, 54 may each operate under a 24 MHz (6 MHz×4) format as required in the U.S and as shown in FIG. 3.

The RF signal arrives at the antenna port 60 from microphones 12, 14. The front end modules 52, 54 may be provided with a preselection band pass filter (BPF) 62 having a bandwidth of 24 MHz). In this example, the preselection filter 62 allows for operation of the system 10 on any one or all of 4 non-overlapping, but contiguous television broadcast channels of 6 MHz each.

A multiplexer or multiplexing switch 64 under control of the receiver processor 34 may allow any one or more of the 4 broadcast channels to be selected. As each of the 4 broadcast channels is selected, a respective 6 MHz bandpass filter 66 may pass a signal on the selected broadcast channel to a linear amplifier 68 and 6 MHz post bandpass filter 70. A second multiplexer or switch 72 under control of the receiver processing unit 34 routes the signal of the selected broadcast channel to an optional automatic gain control (AGC) amplifier 74 and to a diode double balanced (DDB), or other high linearity type rf mixer 76.

Within the mixer 76, the selected broadcast channel may be mixed with the selected frequency from the oscillator 56 to reduce the selected broadcast channel to a common IF frequency (IF1). It should be noted in this regard that the oscillator 56 may be programmed in 6 MHz increments to reduce the selected broadcast channel to the same baseband frequency IF1 and may be used with any of the four broadcast channels that may be selected by switches 64, 72.

Figure 4:
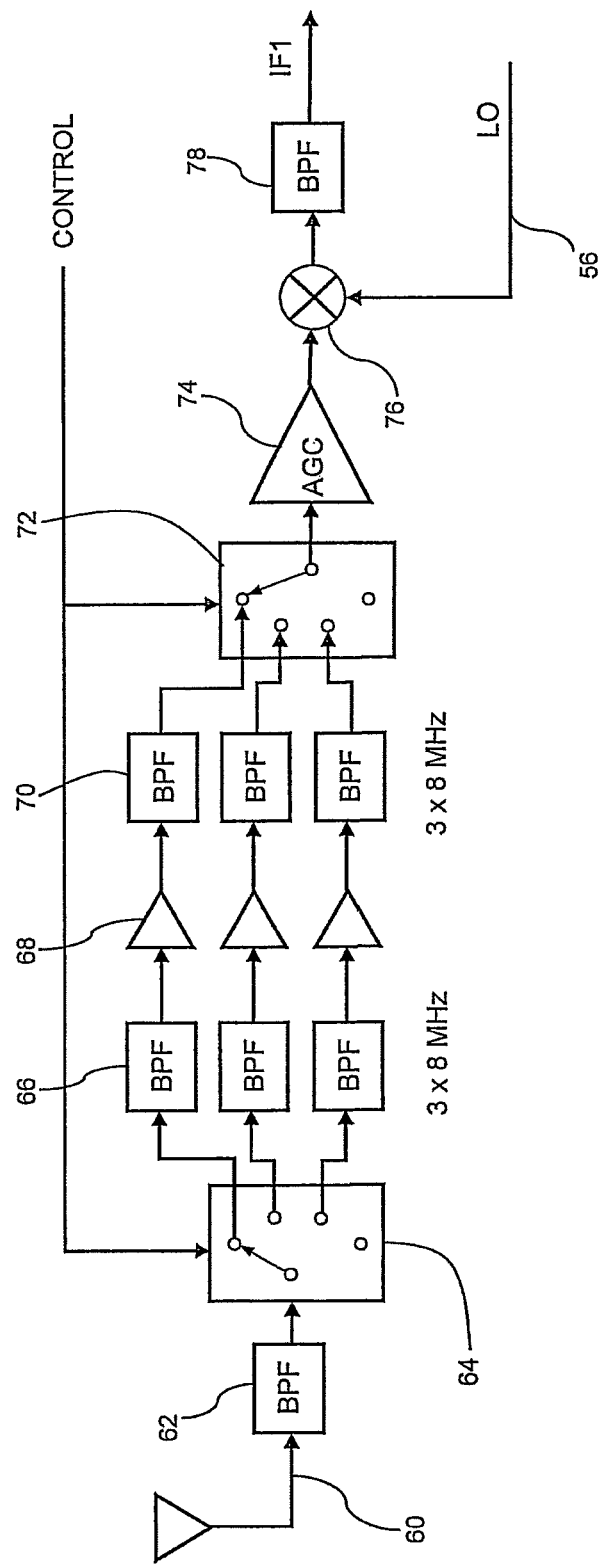
FIG. 4 is another example of the receiver front end of FIG. 2 for 8 MHz standard TV channels in Europe, China, etc.

FIG. 4 depicts a front end module 52, 54 that may be use in regions having an 8 MHz TV broadcast bandwidth. In this case, the module 50 is very similar to that used in the U.S. However, the module for this implementation includes 3 channels, each with a passband of 8 MHz.

Figure 5:
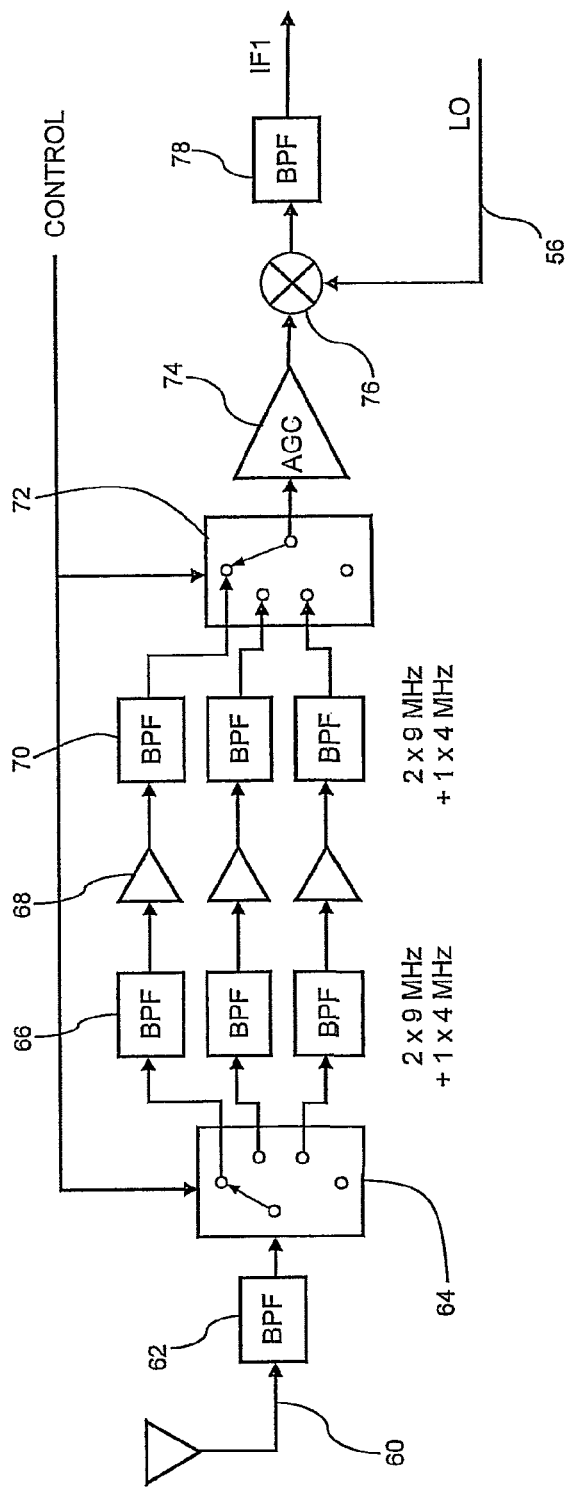
FIG. 5 is another example of the receiver front end of FIG. 2 for Japan.

FIG. 5 depicts a front end module 52, 54 that may be used in Japan. In this case, the full passband is 32 MHz. The subchannels include two 9 MHz wide broadcast subchannels and a single 4 MHz wide broadcast subchannel.

Figure 7:
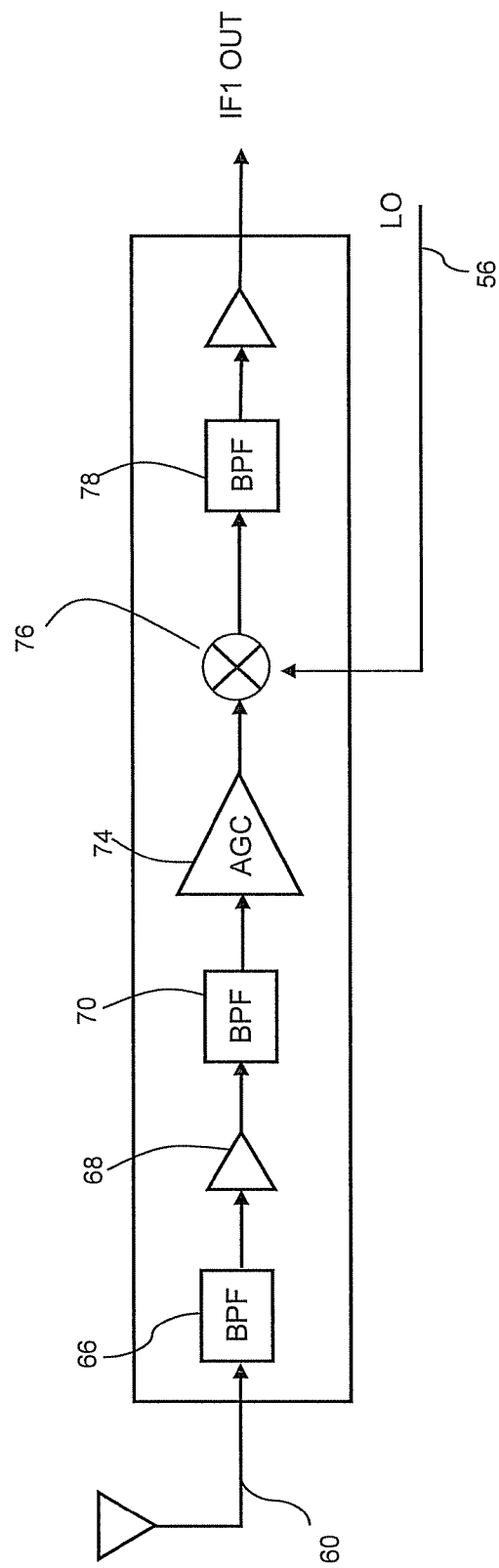
FIG. 7 is a simplified front end module of FIG. 2 for use in the U.S. for a single frequency block.

FIG. 7 is a simplified alternate version of the front end modules 52, 54 that may be used when the number of microphones 12, 14 is relatively small in number. The front end module of FIG. 7 may be used to select any portion of a television broadcast channel or broadcast channel spectrum. In this case, the local oscillator 56 is used to downconvert a portion of the spectrum of a broadcast channel to the predetermined IF frequency.

Figure 6:
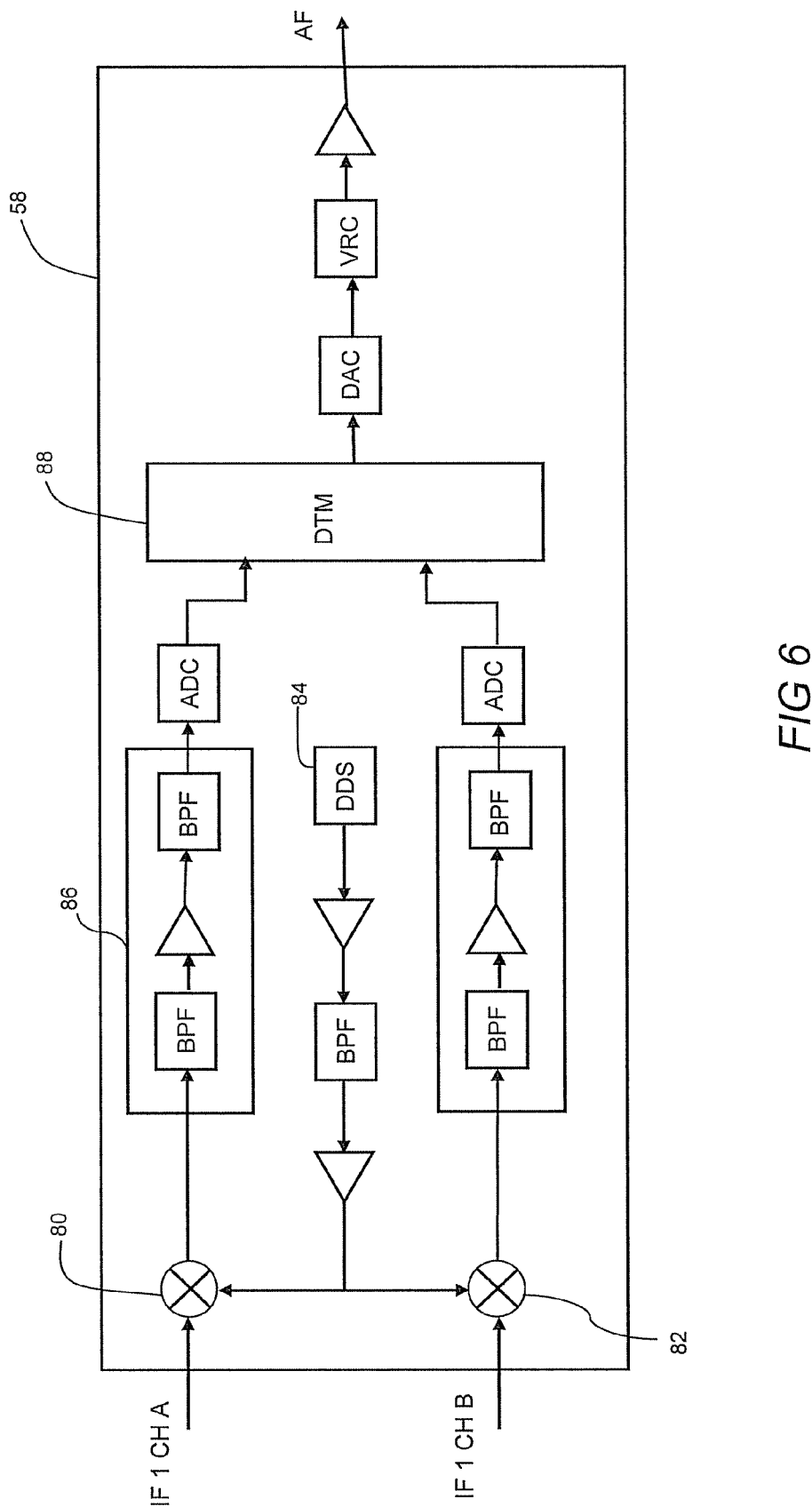
FIG. 6 is an example of the receiver second stage architecture of FIG. 2.

FIG. 6 depicts the second stage receiver 58 of FIG. 2. It should be noted that a separate second stage receiver 58 may be provided to process an audio signal for each output 26, 28, 30, 32.

Within the receiver 58, a set of mixers 80, 82 are used to select a particular frequency or microphone subchannel (portion of the broadcast channel) assigned to each of the microphone units 12, 14 and received through the diversity receivers 16, 18. In this case, the signal from the selected broadcast channel is mixed with the appropriate frequency from a second local oscillator (LO2) 84.

The LO2 oscillator 84 in this module 58 may also be controlled by the processor 34 and may be a Direct Digital Synthesis (DDS) type oscillator. Recall that the entire subband (broadcast channel) was downcoverted in the front end module 52, 54 and passed on to this stage 58. Therefore this oscillator is used to select the specific 125 kHz spaced carrier within the 6 MHz wide broadcast sub-band to target for demodulation.

The filter-amp-filter stage 86 following the mixers 80, 82 in FIG. 6 is used to isolate the selected microphone carrier from each of the other microphone carriers in the broadcast subband prior to the analog to digital converter (ADC).

The outputs from each of the two diversity system modules 52, 54 are sent to this second stage receiver module 58 for final processing. Each signal is converted and may be sent to the digital tuner module 88 where the diversity decision may be made utilizing digital processing techniques. The resulting digital audio signal will be converted to analog, and then processed through the variable ratio compander (VRC) and then sent to the final audio stages 22, 24.

Within the digital tuner module 88, the frame and superframe are recovered from each of the two diversity paths based upon a control signal from the receiver control processor 34. The audio signals within each frame may be routed in accordance with their position within the frame.

A description will now be provided of the control of the system 10. It should be noted that while the connections of FIG. 1 have been previously described in conjunction with the flow of audio signals, those connections are also used to indicate the flow of control information.

With regard to FIG. 1, the base station may be constructed of a set of interconnecting modules. In this regard, the controller 20 (with or without incorporated receivers 16, 18) may be constructed as a one-piece module and each of the channel receivers 22, 24 may be constructed as separate one-piece modules that plug into the controller 20 or that exchange wireless signals with the controller 20 via a low power wireless transceiver (e.g., Bluetooth). The receivers 16, 18 may be constructed in a similar manner.

In order to set up and use the system 10, a user may first enter a unique identifier (e.g., a system address) into each of the wireless microphones 12, 14. Entry of a system address may be accomplished through a user interface (e.g., slideswitches) 38.

Once a system address has been provided to each wireless microphone 12, 14, the user may activate the system 10. Once activated, the control processors 34, 35 may automatically discover and establish a control connection with the diversity receivers 16, 18 and with the channel receivers 22, 24.

Once activated, a programmed processor within the wireless microphones 12, 14 may cause the microphone 12, 14 to proceed to an appropriate default frequency (e.g., the lowest broadcast channel and lowest 125 kHz portion of the broadcast channel, the highest broadcast channel and highest 125 kHz portion of the broadcast channel, etc.) and begin transmitting. In contrast, the receivers 16, 18 and control 20 may begin searching for signals from the microphone units 12, 14. The control 20 may cause the receivers 16, 18 to tune to the default frequency and monitor for signals from the microphones 12, 14. Once the receivers 16, 18 and control 20 receive a signal from the microphone units 12, 14, the user may begin to set up the functionality of the microphones 12, 14 through operation of the channel receivers 22, 24.

In this case either the receiver control processor 34 or a separate programmed set up processor within the controller 20 may present one or more interactive set up screens on a display 40 of the channel receivers 22, 24. In this regard, one or more set up programs 44, 46 retrieved from a non-transitory computer readable medium (memory) 42 and operating on one or more of the processors 34, 35 may be accessed through the display 40 in order to set up the system 10.

For example, a first program 44, 46 may depict a first set up screen including system addresses of each of the wireless microphones 12, 14. Also shown on the first set up screen may an assigned operating frequency (and slot if used under a TDMA format). The user may review the information on the first set up screen and change the assigned operating frequencies (and slots), as appropriate, and save the assigned frequencies into a respective program file 90, 92 for the microphones 12, 14.

Another program 44, 46 may be a spectrum analysis program that depicts a second set up screen on the display 40 and that shows interfering signals (e.g., from local television transmitters, etc.) within the operating spectrum (by broadcast channel) and also by assigned 125 kHz microphone subchannels on each broadcast channel. The user may first review the second set up screen to find microphone subchannels that are free of (or have very little) interference. Upon finding such subchannels, the user may revert to the first set up screen and assign microphones 12, 14 to those channels.

Still another program 44, 46 may be a routing screen presented on the display 40 for assigning microphones 12, 14 to audio outputs 26, 28, 30, 32. In this case, the user may select each microphone 12, 14, in sequence, by system address and assign the microphone 12, 14 to address of a specific output 26, 28, 30, 32. In each case, the changes are written into the respective program file 90, 92 for the microphone 12, 14 and also transferred to the programmed processor of the microphones 12, 14.

Once programmed, the system 10 may perform as described above. The microphones 12, 14 tune to the appropriate assigned frequency (and slot if used).

Similarly, the receiver control processor 34 may cause the switches 64, 72 of the front end modules 52, 54 to tune to the appropriate frequencies and the tuner 88 to select the appropriate microphone subchannel in order to receive signals from each of the microphones 12, 14 route the audio signals in accordance with the program files 90, 92.

The system 10 offers a number of advantages over conventional wireless microphone systems. For example, the system 10 uses a unique narrow band processing structure that operates with a necessary bandwidth of less than 75 kHz per microphone channel and with a 125 kHz microphone channel spacing to accomplish high channel density within a predetermined channel bandwidth without sacrificing audio performance.

The system 10 allows a user to select and operate in a full range of available open channels as needed without the need to carrying multiple processing systems for different frequencies. In this regard, the user may select a set of front end module 52, 54 for the frequency of the spectrum in which the microphone system 10 is to be used. Since the second stage receiver 58 operates at a common second IF, the second stage receiver 58 may be used with any front end module 52, 54.

The system 10 allows the user to select and configure channels within optimized bandwidth configurations for local requirements. In this regard, the front end module 52, 54 may be configured for 6 Mhz broadcast channels, such as used in the U.S., or easily replaced with a front end module 52, 54 configured for other global regions, e.g. China or Europe.

A specific embodiment of method and apparatus for operating a wireless microphone in an audio system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of communicating within a wireless microphone system having a plurality of audio channels comprising:
   dividing a small block of radio frequency spectrum associated with a single television broadcast channel into a plurality of at least 20 contiguous subchannels that are also contiguous with the boundaries of the television broadcast channel where each of the subchannels is less than 75 kHz;
   receiving a channel assignment for operation of a microphone transmitter on one of the plurality of at least 20 contiguous subchannels through a user interface of a microphone receiver from a user;
   the microphone transmitter upon activation proceeding to a default frequency, receiving the channel assignment, tuning to the assigned channel and transmitting an audio signal on the assigned subchannel through a radio frequency isolator or other means for suppressing intermodulation energy coupled between a transmitter and an antenna of the microphone transmitter; and
   receiving the audio signal through the microphone receiver.

2. The method as in claim 1 wherein a maximum frequency deviation further comprises 16.5 kHz.

3. The method as in claim 1 wherein the broadcast television channel further comprises a bandwidth of 6 mHz.

4. The method as in claim 1 further comprising a compander within the microphone transmitter compressing an analog signal received from a microphone.

5. The method as in claim 1 further comprising the microphone transmitter and microphone receiver transceiving the audio signal under a time division multiplex format.

6. The method as in claim 1 further comprising defining the receiver as a diversity receiver.

7. The method as in claim 6 further comprising filtering an input to the receiver with a filter having a passband of frequencies equal to the spectrum of the single television broadcast channel.

8. The method as in claim 7 wherein the filtering further comprises 17 dB at a bandwidth of the small block of radio frequency spectrum.

9. The method as in claim 6 further comprising filtering an input to the receiver with a plurality of filters, each filter having a passband equal to frequencies within non-overlapping portions of the small block of radio frequency spectrum.

10. The method as in claim 9 further comprising adjusting a filtering frequency of each of the plurality of filters to select different non-overlapping portions of the small block of radio frequency spectrum.

11. The method as in claim 6 further comprising filtering an input to the receiver with a filter having a passband of frequencies defined by the spectrum of the small block of radio frequency spectrum.

12. The method as in claim 11 further comprising a downconverter downconverting the passband frequencies of the small block of radio frequency spectrum to an intermediate frequency.

13. The method as in claim 11 further comprising a separate receiver separating each of the plurality of contiguous subchannels from the downconverted passband frequencies.

14. An apparatus for communicating within a wireless microphone system having a plurality of audio channels comprising:
a base station that divides a small block of radio frequency spectrum associated with a single television broadcast channel into a plurality of at least 20 contiguous subchannels that are also contiguous with the boundaries of the television broadcast channel where each of the subchannels is less than 75 kHz;
at least one wireless microphone that transmits an audio signal on one the plurality of subchannels through a transmitter with a radio frequency isolator or other means for suppressing intermodulation energy coupled to an antenna, the radio frequency isolator having a bandwidth no larger than any one of the plurality of divided subchannels; and receiving the audio signal through a microphone receiver; and
a user interface of the base station that receives a channel assignment from a user of the base station for operation of the at least one wireless microphone on an assigned one of the plurality of at least 20 contiguous subchannels wherein the at least one wireless microphone upon activation sends a signal to the base station, receives the channel assignment, tunes to the assigned one channel and transmits the audio signal to the base station on the assigned at least one channel.

15. The apparatus as in claim 14 further comprising a pair of diversity receivers that receive signals from the wireless microphones.

16. The apparatus as in claim 15 further comprising a transmitter within at least one of the diversity receivers that transmits a synchronization signal to the at least one wireless microphone.

17. The apparatus as in claim 14 further comprising a multiplexer that selects one of the at least 20 contiguous subchannels based upon a system address of the at least one wireless microphone and routes an audio signal on the selected subchannel to one of a plurality of outputs of the base station based upon the system address.

18. An apparatus for communicating within a wireless microphone system having a plurality of audio channels comprising: a base station, the base station including a pair of diversity receivers, a controller, a user interface and at least one designated channel receiver, the controller and pair of diversity receivers divides a small block of radio frequency spectrum associated with a single television broadcast channel into a plurality of at least 20 contiguous subchannels that are also contiguous with the boundaries of the television broadcast channel where each of the subchannels is less than 75 kHz, the diversity receivers select at least one of the at least 20 contiguous subchannels based upon a system address of a wireless microphone and a channel assignment received from a user of the wireless micro phone system through the user interface the wireless micro hone upon activation sends a signal to the base station, receives the channel assignment, tunes to the assigned subchannel and transmits an audio signal, the base station reduces the audio signal from the wireless microphone on the selected subchannel to baseband and route the audio signal to the at least one designated channel receiver, the designated channel receiver routing the audio signal to one of a plurality of outputs of the designated channel receiver based upon the system address and assigned subchannel of the wireless microphone.

19. The apparatus as in claim 18 wherein the user interface further comprises a user interface accessible through the at least one designated channel receiver, the user interface comprising user interface software from a non-transitory computer readable medium, the user interface allowing a user to assign the system address to the at least one wireless microphone.

20. The apparatus as in claim 19 wherein the user interface further comprises the user interface accessible through the at least one designated channel receiver, the user interface comprising user interface software from the non-transitory computer readable medium, the user interface allowing the user to assign one of the contiguous subchannels to the at least one wireless microphone based upon the system address.

* * * * *